United States Patent [19]
Birmingham

[15] 3,657,695
[45] Apr. 18, 1972

[54] LEVELING INDICATOR
[72] Inventor: Robert C. Birmingham, Box 261 R 6, Adrian, Mich.
[22] Filed: Apr. 13, 1970
[21] Appl. No.: 27,641

[52] U.S. Cl. .................... 340/52 H, 33/206, 340/282
[51] Int. Cl. .................................................. B60q 1/00
[58] Field of Search ............. 340/52 H, 52, 282, 52 R; 180/41; 280/6; 33/206 D, 206 DL; 200/61.47, 61.52; 335/205

[56] References Cited

UNITED STATES PATENTS

| | | | |
|---|---|---|---|
| 2,745,091 | 5/1956 | Leffler | 340/282 |
| 3,363,231 | 1/1968 | Grosgebauer et al. | 340/52 |
| 2,214,161 | 9/1940 | Cater | 340/52 |
| Re21,038 | 3/1939 | Leins | 335/205 |
| 2,296,053 | 9/1942 | Porter et al. | 200/61.52 |
| 2,914,628 | 11/1959 | Varner | 200/61.47 |

Primary Examiner—John W. Caldwell
Assistant Examiner—Glen R. Swann, III
Attorney—Allen D. Gutchess, Jr.

[57] ABSTRACT

A leveling indicator is provided for house trailers and the like to aid in parking the trailer on the level. The indicator incorporates mercury switches which operate four lamps, two to indicate transverse tilting of the trailer and two to indicate longitudinal tilting thereof. The indicator mounts on the front wall of the trailer in a position to be seen in the rear view mirror of the towing vehicle. It is thereby a simple maneuver to manipulate the trailer back and forth at the site until all four lamps are off, indicating that the trailer is in a level attitude.

7 Claims, 6 Drawing Figures

Patented April 18, 1972

INVENTOR.
ROBERT C. BIRMINGHAM
BY
Allen D. Gutchess, Jr.

Patented April 18, 1972

INVENTOR.
ROBERT C. BIRMINGHAM
BY
Allen D. Gutchess, Jr.
ATTORNEY

LEVELING INDICATOR

This invention relates to a leveling indicator, particularly for house trailers.

When parking a trailer at a site, it is necessary that the trailer be level from both a transverse and a longitudinal standpoint, for comfort and safety, and to enable proper operation of certain appliances in the trailer, such as absorption-type refrigerators.

Heretofore, in leveling a trailer, it has been the usual practice to move the low wheel of the trailer up on a wedge-shaped chock until a spirit level on the trailer indicates the proper attitude. Longitudinal leveling has been accomplished by raising or lowering the tongue with an integral jack. In such instances, unless the driver had an assistant, it has been necessary for the driver to leave the towing vehicle and check the leveling indicator at the trailer to determine whether or not the trailer is level, and then to return to the vehicle to further manipulate the trailer, if it is not.

The present invention provides a leveling indicator which is mounted on the front wall of a trailer in a position to be seen through the rear view mirror of the towing vehicle. The driver thereby can manipulate the vehicle and the trailer at the site until the indicator shows that the trailer is level, this being done without the driver leaving his seat after he switches the indicator on. The indicator is particularly convenient for travel and camping types of house trailers wherein the trailer is moved from site to site relatively frequently.

The leveling indicator embodying the invention has four indicating lamps, two to indicate transverse tilt of the trailer, toward either side, and two to indicate longitudinal tilt of the trailer, toward the back or front. The lamps are operated by gravity sensitive devices, preferably in the form of mercury switches. These switches are mounted in adjustable brackets so as to be adjusted to precise positions after the indicator is mounted on the front wall of the trailer. In a preferred form, the lamps are powered by batteries which enable the indicator to be self-contained, without the necessity for wiring the indicator to an external power source, such as the electrical system of the towing vehicle. Also in a preferred form, the operation of the leveling indicator is controlled by a magnetically operated switch. This can be located near the top wall of the housing or cover of the indicator so that a magnet can be placed thereon to close the switch and render the indicator operative when the trailer is to be parked at the site.

It is, therefore, a principal object of the invention to provide a leveling indicator for a trailer.

Another object of the invention is to provide a leveling indicator for a trailer which is visible from the driver's seat of the towing vehicle.

Still another object of the invention is to provide a leveling indicator for a trailer having visual indicators or lamps to show both transverse and longitudinal tilt of the trailer.

A further object of the invention is to provide a leveling indicator for a trailer, which is turned on by a magnetically operated switch.

Yet a further object of the invention is to provide a leveling indicator for a trailer, which is entirely self-contained.

Many other objects and advantages of the invention will be apparent from the following detailed description of a preferred embodiment thereof, reference being made to the accompanying drawings, in which.

Figure 1:
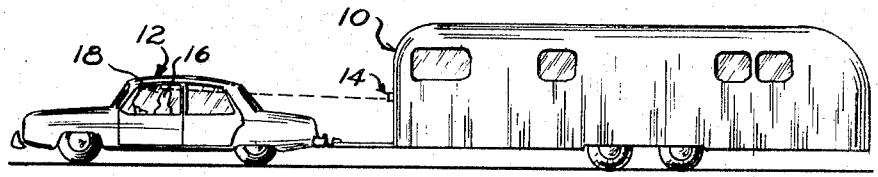
FIG. 1 is somewhat schematic side view in elevation of a trailer, towing vehicle, and leveling indicator according to the invention.

Referring particularly to FIG. 1, a trailer 10 is shown connected to a towing vehicle or automobile 12. The trailer 10 is a house trailer which must be horizontally disposed, both transversely and longitudinally, when at a site. This is important from the standpoint of comfort and safety for the occupants and also is important to proper operation of certain appliances therein, such as absorption-type refrigerators. More specifically, the house trailer 10 can be a travel trailer or camping trailer which is moved from site to site relatively frequently, in the order of every few days or so. At each site, of course, the trailer must be properly leveled once again. Heretofore, it has been necessary for the driver, if alone, to manipulate the trailer to an approximately level site, then get out of the vehicle and check spirit levels placed on appropriate portions of the trailer to determine whether or not it is level. This operation must be continuously repeated until the trailer is level. Even with an assistant available, the leveling is time consuming since the assistant must check the levels, then report to the driver, and then move out of the way while the trailer is further manipulated.

In accordance with the invention, a leveling indicator indicated at 14 is mounted on the front wall of the trailer 10 and provides a visual indication as to whether the trailer is tilted, either transversely or longitudinally. The indicator 14 is located in a position such that a driver 16 in the vehicle 12 can see the indicator through a rear view mirror 18. Consequently, it is a simple matter for the driver 16 to manipulate the trailer 10 until in a level condition at the site without even turning around.

Figure 2:
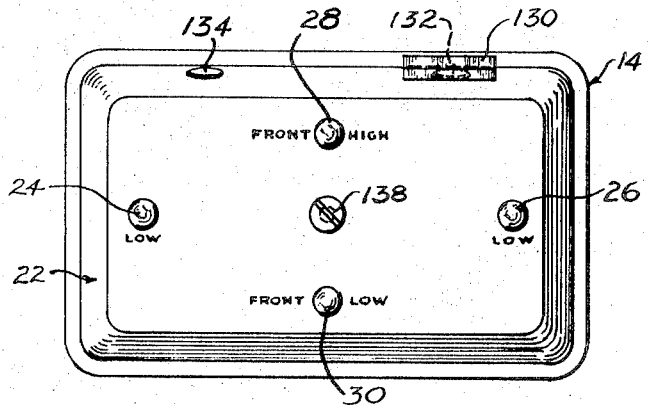
FIG. 2 is a front view in elevation of the leveling indicator shown in FIG. 1.

The leveling indicator 14 basically includes a mounting base assembly or member 20 (FIG. 3) and a cover 22 (FIG. 2). The cover 22 has four translucent buttons or lenses 24–30 mounted in a diamond-shaped pattern to indicate the condition of the trailer 10. When the lens 24 is lighted by a lamp therebehind, it indicates that the trailer 10 tilts transversely downwardly toward the corresponding side. When the lens 26 is lighted, it indicates that the trailer 10 is tilted transversely downwardly toward the other side. When the upper lens 28 is lighted, it indicates that the trailer 10 is tilted longitudinally downwardly toward the rear, and that the front is high. When the lower lens 30 is lighted, it indicates that the trailer 10 is tilted longitudinally downwardly toward the front, and that the front is low. The driver 16 consequently can immediately tell the condition of the trailer 10 through the rear view mirror 18 by seeing which of the lenses 24–30, if any, are lighted. He can then manipulate the trailer accordingly, until there are no lights, without even turning around. Thus, leveling usually can be achieved in a matter of only a minute or two, at most.

Four lamps 32–38 are associated with the four lenses 24–30 for lighting same. As shown, the lamps are of the bayonet-type and are received in bayonet-type sockets 40. These are of a conventional construction, having center spring-loaded terminals 42 and grounded shells 44 to provide an electrical path for the lamps. In this instance, the shells 44 have prongs 46 snapped into openings 48 of a ground panel 50, although the sockets 40 can be spot welded or otherwise suitably affixed to the panel.

The ground panel 50 is connected to a base panel 52, with the two panels 50 and 52 constituting the mounting member or assembly 20. The ground panel 50 can be affixed to the base panel 52 through plastic projections 54 which are integral with the base panel 52 and extend through openings in the panel 50, after which they are flared outwardly over washers 56 to hold the panel in place. Other suitable means can be used to mount the ground panel 50 on the base panel 52 but the two are preferably electrically insulated since the base panel 52 will be affixed to the wall of the trailer 10 which is usually of metal; consequently, the indicator components should be electrically isolated therefrom. The plastic projections 54 can be hollow so as to receive fasteners by means of which the mounting member 20 can be affixed to the trailer front wall. The plastic projections 54 also hold the ground panel 50 away from the base panel 52 to provide space therebetween in which wiring for the components of the level indicator 14 can be located. This arrangement protects the wiring and minimizes the possibility of it being accidentally snagged or broken, as can otherwise occur if it is exposed in front of the panel 50.

The four lamps 32–38 are operated by gravity-sensitive switches, and specifically double-pole mercury switches 58 and 60. However, in place of these switches, a single mercury switch can be used for each of the lamps; pendulum type switches or those embodying a ball confined to rolling movement on an incline can also be used. The mercury switches are preferred since they are compact, relatively maintenance free, sealed from dirt, and accurate. Further, the two double-pole mercury switches are preferred to four single-pole switches because the assembly of the components in the manufacture of the indicator 14 is thereby somewhat simplified. On the other hand, two single-pole mercury switches can be employed in side-by-side relationship for the switches 58 and 60. If these are independently and adjustably mounted, the degree of sensitivity of the indicator 14 can be more effectively controlled.

Figure 5:
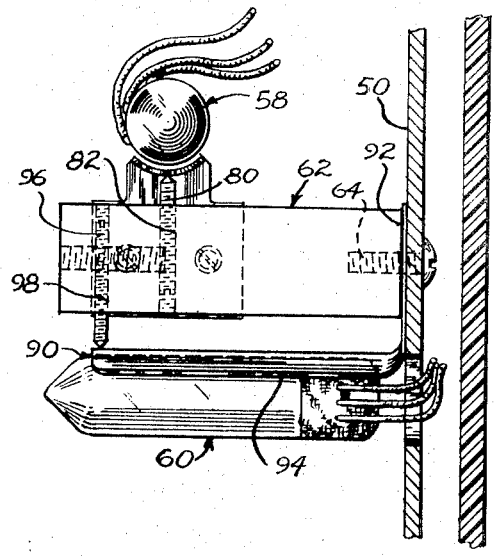
FIG. 5 is a further enlarged, fragmentary view in cross section taken along the line 5—5 of FIG. 3.

The mercury switch 58 is mounted on a central projecting support 62, preferably of insulating material, which is affixed to the ground panel 50 by suitable fasteners 64 (FIG. 5). The mercury switch 58 is located parallel to the mounting member 20 and transversely to the longitudinal extent of the trailer. The switch 58 contains a glob of mercury which is effective to make contact between a center electrode or contact 66 (FIG. 6) and either of two end electrodes or contacts 68 and 70 when the switch 58 is tilted longitudinally in either direction, as occurs when the trailer leans to either side. If the trailer tilts toward the right, as viewed when facing in a forward direction, the mercury will establish contact between the electrodes 66 and 68 to light the lamp 32. If the trailer tilts toward the left, the mercury establishes contact between the electrodes 66 and 70 to light the lamp 34.

In case the leveling indicator 14 is not mounted precisely horizontally on the front wall 10, the mercury switch 58 may provide a false reading. Consequently, the switch 58 is mounted in a manner such that it can be adjusted on the support 62. For this purpose, the switch 58 is carried by a generally L-shaped bracket 72 which has a leg 74 (FIG. 3) affixed to the support 62 by fasteners 76 and a trough-shaped leg 78 to which the switch 58 is affixed by adhesive or other suitable means. A threaded member 80 (FIG. 5) is located in a threaded passage 82 of the support 62 and has an end extending upwardly from the support 62 in contact with the outer end of the bracket leg 78. After the mounting member 20 is mounted on the front wall of the trailer 10, and the trailer is setting level, the threaded member 80 can be turned upwardly or downwardly to adjust the position of the mercury switch 58 so that neither of the lamps 32 or 34 is lighted, and about the same number of turns of the threaded member in either direction is necessary to cause either of the lamps to light.

The mercury switch 60 is mounted parallel to the longitudinal extent of the trailer, being substantially perpendicular to the mounting member 20 and substantially perpendicular to the mercury switch 58. The switch 60 also has three electrodes or contacts 84, 86, and 88 (FIG. 6) engageable by a glob of mercury therein. When the trailer 10 slants downwardly toward the front, a path is completed by the mercury between the electrodes 84 to cause the lower lamp 30 to light and when the trailer 10 slants downwardly toward the rear, with the front being high, a path is completed between the electrodes 84 and 88 to cause the upper lamp 28 to light.

Particularly because the front wall of the trailer 10 may not be truly vertical, the mercury switch 60 is also mounted in an adjustable bracket 90. This has a vertical leg 92 held between the ground panel 50 and the support 62 and a trough-shaped leg 94 extending outwardly from the panel 50. A threaded member 96 is located in a threaded passage 98 of the support 62 and engages an outer end of the bracket leg 94. The member 96 can then be turned toward or away from the bracket 90 accordingly to change the position of the mercury switch 60. Again when the trailer is level, the bracket 90 is adjusted by the threaded member 96 until both of the lamps 28 and 30 are off, with the same number of turns of the member 96 needed in each direction to cause one of the lamps 28 and 30 to light. The brackets 72 and 90 are sufficiently resilient to move with the threaded members 80 and 96 regardless of the direction in which they are turned.

Figure 3:
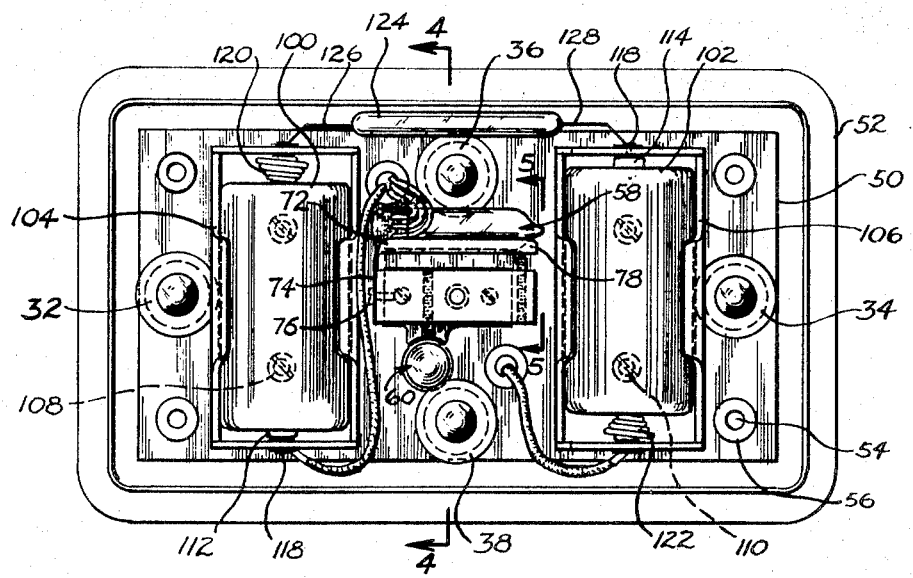
FIG. 3 is an enlarged view in elevation of the leveling indicator of FIG. 2, with the front cover removed.

Power can be supplied for the lamps by any suitable source. In a preferred form, however, the power source constitutes two D-size dry cell batteries 100 and 102 (FIG. 3). The use of batteries makes the indicator 14 entirely self-contained so that it is not necessary to connect the indicator with power from the trailer or from the towing vehicle. Further, two of the batteries 100 and 102 will last an entire camping or travel season, even if the trailer is moved frequently.

Figure 6:
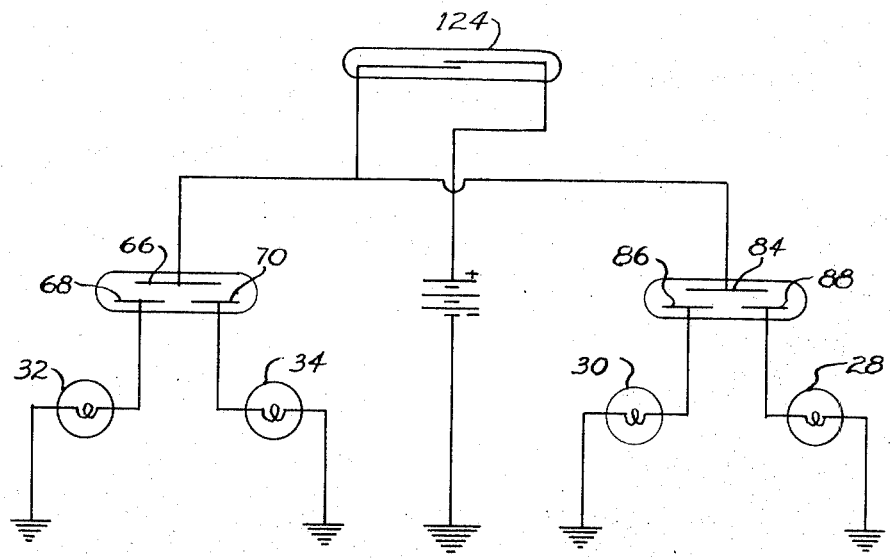
FIG. 6 is a diagrammatic view of a circuit used in the leveling indicator.

As shown, the batteries 100 and 102 are held in plastic receptacles 104 and 106 mounted on the panel 50 by fasteners 108 and 110. Central terminals 112 and 114 of the batteries 100 and 102 are urged against terminals 116 and 118 by coil springs 120 and 122, which constitute ground terminals. The terminals are connected by suitable conductors, as shown in FIG. 6, to the central electrodes 66 and 84 of the mercury switches 58 and 60.

A switch is provided to prevent operation of the lamps 32–38 when the trailer is being towed. This switch can be manually operated or can be a commercially available, magnetically operated reed switch 124 having one terminal or contact connected to the coil spring 120 through a heavy conductor 126 (FIG. 3) which also serves to partially support the switch, and another terminal or contact connected to the central terminal 118 by a heavy conductor 128. The switch contacts are normally open until subjected to the force of a magnet, which then closes the switch 124 and provides a circuit between the power source or batteries 100 and 102 and the mercury switches 58 and 60.

When the trailer is to be parked on a site, a magnet 130 (FIG. 2) is placed on an upper wall of the cover 22 to cause the terminals of the switch 124 to close. Metal buttons or inserts 132 and 134 are mounted on or in the upper wall of the cover 22 to hold the magnet 130 in place while the trailer 10 is being parked. During this time, the contacts of the switch 124 are held closed and the lamps 32–38, through the lenses 24–30, provide the appropriate indication of the condition of the trailer for the driver 16. The metal inserts 132 and 134 are offset somewhat to the sides of the switch 124 since an offset position of the magnet 130 is more effective to close the switch contacts.

Figure 4:
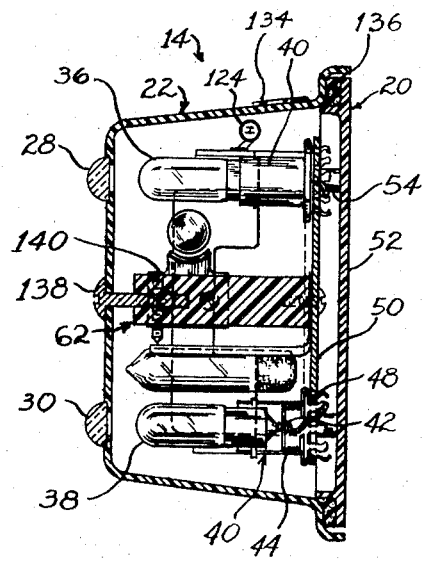
FIG. 4 is a view in transverse cross section taken along the line 4—4 of FIG. 3, but with the front cover in place.

The magnetically operated switch 124 is preferred to a conventional manually operated switch since the switch 124 is entirely enclosed within the cover 22 and thereby is fully waterproof. To further improve water-proofness and weather-tightness, a gasket 136 (FIG. 4) is located between the cover 22 and the mounting member 20, with the gasket being compressed somewhat as the cover is attached to the mounting member by a central screw 138 received in a threaded passage 140 of the support 62.

It will be seen from the above, that the invention provides a leveling indicator which greatly facilitates level parking of a trailer, and particularly a travel or camping trailer. The indicator is economical and simple to operate, completely self-contained, and weather-proof. Further, it is compact and attractive, blending in well with the lines of trailers.

Various modifications of the above described embodiment of the invention will be apparent to those skilled in the art and it is to be understood that such modifications can be made without departing from the scope of the invention, if they are within the spirit and the tenor of the accompanying claims.

I claim:

1. In combination, a trailer having a front wall, a leveling indicator comprising a mounting member, means affixing said mounting member to a front wall of said trailer in a position to be seen from the driver's seat of a towing vehicle, two visual indicators mounted on said member in spaced, predetermined relationship, gravitational-sensitive switch means mounted relative to said member and in a position extending generally transversely to the longitudinal extent of said trailer, a source of power, circuit means connecting said source of power, said switch means, and said two visual indicators and effective to operate one of two said visual indicators if the trailer tilts transversely in one direction and to operate the other of said visual indicators if the trailer tilts transversely in the opposite direction, two additional visual indicators mounted on said mounting member in spaced, predetermined positions, additional gravitational-sensitive switch means mounted relative to said member and positioned generally parallel to the longitudinal extent of the trailer, additional circuit means connecting said source of power, said additional switch means, and said two additional visual indicators and effective to operate one of said additional indicators if the trailer tilts longitudinally toward the front, and to operate the other of said additional indicators if the trailer tilts longitudinally toward the rear.

2. The combination according to claim 1 characterized by said switch means being at least one mercury switch, means including an adjusting screw mounting said switch on said mounting member to enable the position of said switch to be changed, said additional switch means being at least one additional mercury switch, and means including an adjusting screw mounting said additional switch on said mounting member to enable the position of said additional switch to be changed.

3. The combination according to claim 1 further characterized by said two visual indicators and said two additional visual indicators being located on said mounting member in a diamond-shaped pattern with said two visual indicators being located on a generally horizontal line and with said two additional visual indicators being located on a line perpendicular to the line through said two visual indicators.

4. A leveling indicator for a house trailer or the like comprising a mounting panel having means to enable said panel to be mounted on the front wall of a house trailer so as to be seen from the driver's seat of a towing vehicle, two visual indicators mounted on said panel in spaced, predetermined positions on a generally horizontal line, mercury switch means mounted horizontally on said panel in a plane substantially parallel to said panel, adjustable means for supporting said mercury switch means on said panel to enable the position of said switch means to be changed relative to said panel, a source of power, circuit means connecting said source of power, said mercury switch means, and said two visual indicators and effective to operate one of said two visual indicators if the trailer tilts transversely in one direction and to operate the other of the two visual indicators if the trailer tilts transversely in the other direction.

5. A leveling indicator according to claim 4 characterized by two additional visual indicators mounted on said panel in spaced, predetermined positions along a line which is perpendicular to the line through said two visual indicators, second mercury switch means mounted horizontally on said panel in a plane substantially perpendicular to said panel and substantially perpendicular to the first mercury switch means, and additional circuit means connecting said power source, said second mercury switch means, and said two additional visual indicators and effective to operate one of said two additional visual indicators if the trailer tilts longitudinally toward the front and to operate the other of said two additional visual indicators if the trailer tilts longitudinally toward the rear.

6. An indicator according to claim 4 characterized by a cover mounted on said panel and enclosing all of the components of said indicator, a magnetically operated switch located adjacent an upper wall of said cover whereby a magnet can be placed on the upper wall for closing said switch and causing it to remain closed.

7. An indicator according to claim 6 characterized by said upper wall of said cover having magnetic means associated therewith for magnetically retaining the magnet thereon.

* * * * *